Nov. 10, 1964 W. G. MARTIN 3,156,598
METHOD OF MAKING A FIBER REINFORCED RESIN TUBULAR ARTICLE
Filed June 12, 1961
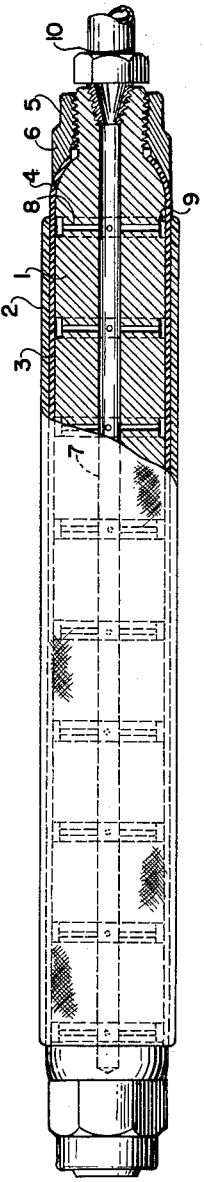
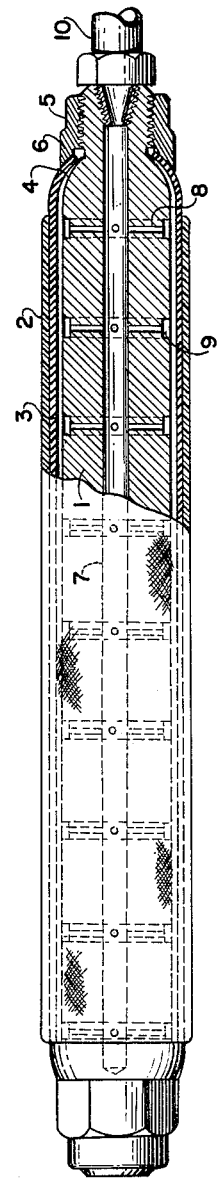
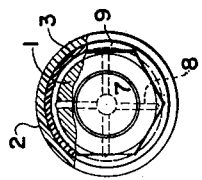
INVENTOR.
WESLEY G. MARTIN
BY
Attorneys

3,156,598
METHOD OF MAKING A FIBER REINFORCED RESIN TUBULAR ARTICLE

Wesley G. Martin, Whitefish Bay, Wis., assignor to A. O. Smith Corporation, Milwaukee, Wis., a corporation of New York
Filed June 12, 1961, Ser. No. 120,868
4 Claims. (Cl. 156—161)

This invention relates to a method of curing fiber-reinforced resin articles. This application is on continuation-in-part of application Serial No. 620,912, filed November 7, 1956, and entitled "Method of Curing Reinforced Resin Articles," now abandoned.

Thermosetting resin articles are frequently reinforced by fibrous material, such as glass, to increase the mechanical properties of the article. In the manufacure of tubular articles, such as pipe, long reinforcing strands of fibrous material are coated or otherwise impregnated with a liquid uncured resin and wound in a generally helical pattern on a mandrel to form the tubular article. After winding, the resin is cured or polymerized to form an integrally bonded structure.

Many of the resins employed in laminated structures of this type have fairly high rates of shrinkage during the curing or polymerization phase of processing. If the reinforcing fibers in the laminate are under little or no tension during the curing operation, the cured laminate will have the fibers in compression and the resin in some tension under "no-load" conditions. This condition is the opposite of that which would be desired for a laminate being made to withstand stresses as, for example, when a pipe section is subjected to internal pressure.

It has been proposed in the patent application Serial No. 620,911, filed November 7, 1956, of the same inventor, now Patent No. 3,033,730, to prestress the fiber reinforcement prior to curing to overcome the above condition. However, if the fibers are prestressed in tension to an appreciable degree, the fibers in adjacent layers will rub or abrade one another and thereby decrease the mechanical properties of the pipe. Furthemore, when prestressing the fibers, the fibers in the inner layers tend to cut through the liquid resin, leaving resin-free fiber surfaces exposed on the inner surface of the pipe. In effect, the resin is squeezed outwardly through the pipe wall during prestressing with the result that the finished pipe section has fiber-rich areas in the inner layers and resin-rich areas in the outer layers.

The present invention is directed to a method of curing a fiber-reinforced resin laminate, such as a pipe seciton, whereby the tendency for the fiber reinforcement to cut through the resin in the inner layers of the pipe is eliminated and a pipe structure results in which there is a uniform relationship between the fiber and resin content throughout all of the layers of the pipe.

According to the invention, resin impregnated fibrous strands are wound in a generally helical pattern on an expandable cylindrical mandrel to form the pipe section. After winding, the resin is partially polymerized to a solid, generally flexible state and the resin in this state is capable of bearing some load. After the resin is partially polymerized, the mandrel is expanded radially to put the helically wound fibers under tension, and while the fibers are under tension, the resin is fully polymerized to form an integrally bonded structure in which the tensile stress of the fibers substantially balances the compressive stress in the resin.

As the resin is in a solid leathery state during the prestressing operation, the expansion of the fibers will not squeeze the resin outwardly through the pipe section but instead a uniform relationship between the fibers and the resin will be maintained throughout the thickness of the pipe section.

Other objects and advantages will appear in the course of the following description.

The drawings illustrate the test mode presently contemplated of carrying out the invention.

In the drawings:

FIGURE 1 is a side elevation of a mandrel, with parts broken away and sectioned, on which the pipe section is fabricated;

FIG. 2 is an end view of the mandrel of FIGURE 1 with parts broken away and sectioned; and FIG. 3 is a view similar to FIGURE 1 showing the expansion of the mandrel to place the fiber reinforcement under tension.

The drawings illustrate an apparatus for curing a fiber reinforced resin article such as a pipe section, and comprises a mandrel 1 on which the pipe section 2 is fabricated.

Mandrel 1 has a generally cylindrical shape and is covered with a flexible sleeve 3 made of rubber, plastic, synthetic material or the like. Sleeve 3 is tightly disposed on the outer surface of the mandrel, and the ends of the sleeve are secured to the corresponding tapered end surfaces 4 of the mandrel by ring clamps 5. The clamps 5 are threadedly engaged with the ends of mandrel 1 and the inner annular flange 6 of each clamp secures the sleeve 3 tightly to the surfaces 4.

The pipe section 2 is fabricated on the mandrel by winding a fibrous material, such as long substantially continuous fibers, fiber strands, roving, yarn or the like, which are suitably impregnated with a liquid uncured thermosetting resin, in a helical or circumferential pattern on the sleeve 3.

The fibers may take the form of synthetic, mineral, vegetable or animal fibers such as glass, asbestos, rayon, cotton, or the like.

The resin may take the form of any of the conventional thermosetting resins. For example, the resin may be a thermosetting polyester resin such as a polyester resin in which at least one of the reactants contains an unsaturated double bond in an aliphatic group. For example, the unsaturated bond may be in the polybasic acid component such as when maleic acid or anhydride is reacted with a polyhydric alcohol such as glycerol, ethylene glycol, diethylene glycol, propylene glycol, sorbitol, mannitol, pentaerythritol, polyethylene glycol and the like. In addition, thermosetting resins of the diallylphthalate, epoxide, furane, phenolic and melamine types may also be employed as the resin.

The sleeve 3 is expanded outwardly from the mandrel to prestress the helically wound reinforcement by introducing fluid pressure between the sleeve and outer surface of the mandrel. This is accomplished by providing the mandrel with a central longitudinal opening 7 and a series of radially extending passages 8 which communicate with the opening 7. The radial passages communicate with circumferential grooves 9 formed in the outer surface of the mandrel. In addition, the grooves 9 may be connected by longitudinal grooves, not shown.

A fluid under pressure, such as air or oil, is introduced into opening 7 by means of a fitting 10 which is threadedly engaged within the open end of opening 7. The fluid introduced within the mandrel exerts a pressure against the sleeve 3, forcing the same outwardly to expand the reinforcement radially and put the windings under tension.

Expanding the sleeve 3 outwardly to put the helical wound reinforcement under tension serves to prestress the fiber reinforcement. By maintaining this prestressed condition during the curing of the resin, the compressive stress resulting from the shrinkage of the resin is substantially balanced by the prestress initially applied to the reinforcement so that the reinforcement will not be under compression in the finished article under "no-load" conditions.

To prevent squeezing the resin outwardly through the pipe wall as the fiber reinforcement is placed under tension, the resin is partially polymerized after the pipe section has been fabricated on the mandrel and before the prestressing operation is carried on.

The resin is partially polymerized by a time-temperature control until the resin is in a solid, deformable state and is capable of bearing some load. This partially polymerized state is different from both the uncured state in which the resin is a thin liquid and can bear no load and the fully polymerized state in which the resin is an infusible solid which cannot generally be deformed.

The degree of polymerization or conversion of the resin needed to achieve this deformable solid state depends on numerous factors, such as the particular resin employed, the catalyst or curing agent used with the resin, the curing temperature and the time of curing. As the viscosity of a particular resin at a given percent of conversion may differ widely from the viscosity of a second resin at the same percent of conversion, it is not practical to set forth a particular percentage of conversion which is required in order to bring about the solid deformable properties in the resin which are desired. However, a conversion or polymerization of about 50% to 70% will generally provide these properties with most resins.

After the resin has been partially polymerized, the sleeve 3 is expanded outwardly by introducing fluid under pressure into the axial opening 7 of the mandrel 1. Outward radial movement of the sleeve 3 puts the fiber reinforcement in tension and provides a prestress for the fibers.

While the fiber reinforcement is in this prestressed condition, the resin is polymerized to the infusible state to provide a rigid integral structure in which the tension in the fiber reinforcement tends to balance the compressive stress brought about on shrinkage of the resin during the final polymerization.

As an alternative method, the fibrous material, such as long, substantially continuous fibers, is initially coated or impregnated with the liquid uncured thermosetting resin and the resin is then partially cured before the fibrous material is wound on the mandrel. The partially cured resin is in the solid flexible state and, as such, the resin coated fibrous material can be wound in a helical or circumferential pattern about the mandrel. After winding, the sleeve 3 is expanded outwardly to prestress the fibers and while the fibers are in the prestressed condition the resin is fully cured by heat to the infusible rigid state.

The present invention provides a fiber-reinforced resin pipe section having improved mechanical properties. As the resin is partially polymerized before the fiber reinforcement is expanded or prestressed, the resin will deform with the prestressing and will not be squeezed toward the outer layers of the pipe. This results in a pipe wall having a uniform distribution of fiber and resin throughout the wall thickness.

Various modes of carrying out the invention are contemplated as being within the scope of the following claims particularly pointing out and distinctly claiming the subject matter which is regarded as the invention.

I claim:

1. A method of fabricating a fiber-reinforced resin tubular article, comprising winding long substantially continuous reinforcing fibers on a generally cylindrical mandrel in a generally helical pattern, impregnating the fibers with a liquid unpolymerized thermosetting resin, partially polymerizing the resin to a solid deformable state, prestressing the fibers in tension while said resin is in the solid deformable state, and thereafer substantially completely polymerizing the resin to the infusible state while maintaining the prestressed condition on the fibers to provide an integral article having the compressive stress in the polymerized resin substantially balanced by the tension in the fibers and having a uniform distribution of fibers and resin throughout the thickness of the article.

2. A method of fabricating a fiber-reinforced pipe section, comprising winding a strand of fibrous material in a generally circumferential pattern on a cylindrical mandrel to form a pipe section, impregnating the strand with a liquid unpolymerized thermosetting resin, partially polymerizing the resin to a solid flexible state, applying internal pressure within the circumferentially wound material while the resin is in the solid flexible state to place the strand under tension and maintain a uniform distribution of resin and fibrous material throughout the wall of said pipe section, and thereafter substantially completely polymerizing the resin to the rigid infusible state while maintaining the fibrous material under tension to provide an integral structure having the compressive stress in the polymerized resin substantially balanced by the tension in the fibrous material and having a uniform distribution of fibers and resin throughout the thickness of the pipe section.

3. A method of fabricating a fiber-reinforced resin article, comprising winding a fibrous strand impregnated with a liquid uncured thermosetting resin on a hollow flexible sleeve in a substantially helical pattern to form a tubular article, partially curing the resin to a deformable state with the resin in said deformable state having load bearing properties, introducing fluid pressure within the hollow sleeve to force the sleeve outwardly and exert a pressure in the inner surface of the tubular article of sufficient magnitude to place the strand under tension while maintaining the outer surface of the tubular article free of confinement, the load bearing condition of the resin preventing the resin from being squeezed radially inwardly by the tensioning of the strand to thereby maintain a uniform distribution of the fiber strand and resin throughout the thickness of the article, and thereafter substantially completely curing the resin to an infusible state while maintaining the strand in tension to provide an integral article having the compressive strength in the cured resin substantially balanced by the tension of the strand.

4. A method of fabricating a rigid, resin-fiber reinforced tubular article, comprising the steps of applying internal pressure within a tubular article formed of substantially continuous circumferentially wound fibers uniformly impregnated with a partially cured solid deformable thermosetting resin to place the circumferentially wound fibers under tension and maintain a uniform distribution of resin and fibers throughout the wall of said tubular article, and thereafter substantially completely curing the resin to the rigid infusible state while maintaining the internal pressure within said article to provide an integral structure having the compressive strength of the cured resin substantially balanced by the tension in the fibers and having a uniform distribution of fibers and resin throughout the thickness of the pipe section.

References Cited in the file of this patent
UNITED STATES PATENTS

| | | |
|---|---|---|
| 2,794,481 | Anderson | June 4, 1957 |
| 2,862,541 | Brink | Dec. 2, 1958 |
| 2,884,010 | Fischer | Apr. 28, 1959 |